Sept. 19, 1944.    T. E. D. BILDE    2,358,377
SPRAYING DEVICE
Filed Sept. 1, 1942
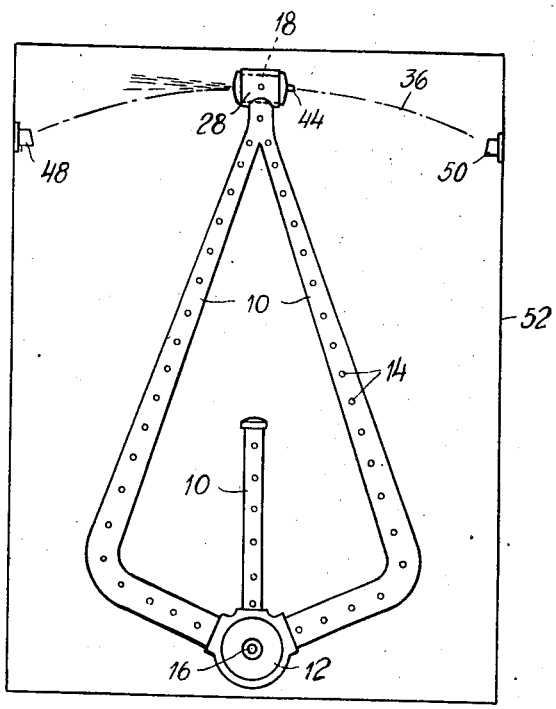
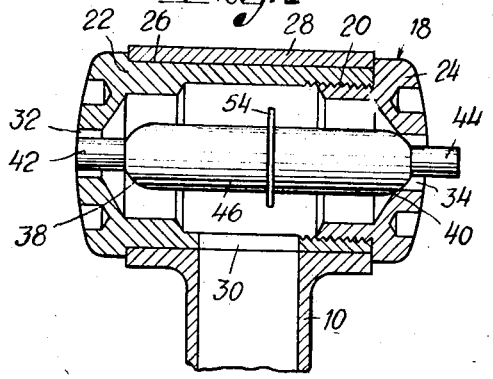
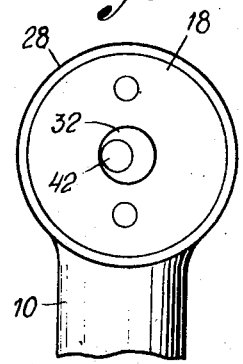

Patented Sept. 19, 1944

2,358,377

UNITED STATES PATENT OFFICE 2,358,377

SPRAYING DEVICE

Tord Erik Daniel Bilde, Ulvsunda, Sweden, assignor to Bolinder's Fabriks Aktiebolag, Stockholm, Sweden, a corporation of Sweden Application September 1, 1942, Serial No. 456,933
In Sweden May 16, 1940

2 Claims. (Cl. 299—71)

This invention relates to reversing members for hydraulically operated oscillating spraying devices for dish-washing machines. It has previously been proposed to effect reversal of spraying devices by means of a jet deflector devised as a wing or plate oscillable between two stops and adapted to be shifted over in the end positions of the spraying device. This wing or plate transmits the reactive force from a liquid jet deflected thereby to the spraying device in the one or other direction and thereby imparts an oscillating movement to the spraying device.

In these known reversing devices, the liquid jet is split to a considerable extent when striking against the wing or plate, with the result that the hydraulic reactive force is considerably reduced so that a relatively great quantity of liquid is required to start the spraying device and to maintain the movement thereof. It has further been proposed to connect spraying devices for sprinkling purposes with a nozzle communicating with liquid under pressure, said nozzle having outlet openings for discharging the liquid in substantially opposite directions and including a valve member adapted alternately to open said outlet openings. The invention particularly relates to spraying devices of this type and has for its object to provide a reversing member which is especially adapted for use in dish washing machines in which there are always difficulties encountered due to solid particles present in the washing or rinsing liquid, which particles are collected in the outlet of the openings of the nozzle and thereby endanger the operation of the reversing member.

This object is attained by mechanism illustrated in the annexed drawing, in which:

Fig. 1 is a plan view of a spraying device for dish-washing machines provided with a hydraulic reversing member constructed in accordance with the invention; Fig. 2 shows in an enlarged scale a horizontal sectional view of the reversing member, and Fig. 3 is a side elevation of the reversing member viewed from the left in Fig. 2.

Although the embodiment of the invention illustrated in the drawing is shown in connection with a spraying device arranged to oscillate about a vertical axis, the invention may be equally well applied to other types of spraying devices, for instance, spraying devices performing parallel oscillating movements. In the embodiment shown, the spraying device includes tubular arms 10 which are connected to a common liquid supply pipe 12 and provided with upwardly directed orifices 14 through which liquid jets under pressure are thrown against the dishes suitably placed above the spraying device, such as in a tray or the like dish holder. During the spraying operation, the spraying device performs an oscillating movement about the axis 16 of the liquid supply pipe, said movement being effected by means of a nozzle 18 disposed at the outer end of the spraying device, said nozzle being described in detail with reference to Figs. 2 and 3.

The nozzle includes a substantially cylindrical casing consisting of two parts 22 and 24 connected to each other by a threaded portion 20. The part 22 has a cylindrical face 26 of smaller diameter than the diameter of the end portion and is mounted in a holder 28 connected to the spraying pipe 10. Through an opening 30 in the cylindrical wall of the casing part 22, the interior of the nozzle is in open communication with the spraying device. Besides the opening 30, the nozzle has two opposite outlet openings 32 and 34, the axes of which are located in the direction of movement of the spraying device, that is, tangentially with respect to the path 36 of the nozzle (see Fig. 1).

The outlet openings 32 and 34 can be closed by means of valves which, in the embodiment shown, are formed by spherical faces 38 and 40, respectively, on a member 46 provided with pins 42 and 44 and which is freely movable within the nozzle. The distance between the faces 38 and 40 is smaller than the distance between the inner edges of the outlet openings 32 and 34, which constitute valve seats for the spherical faces. As a result thereof, one of the valves only can be in closed position at a time. On that side of the nozzle where the valve is open, that is on the left side in the position shown in Fig. 2, the pin 42 rests in the opening 32. Since the diameter of the pin is smaller than that of the outlet opening, liquid will be discharged through the opening 32 in the position shown in Fig. 2, whereas the opening 34 is closed. As will be seen from Fig. 2, the length of each pin is such that the pin on that side of the nozzle where the outlet opening is closed, will extend somewhat outside the outlet opening. Reference numerals 48 and 50 (Fig. 1) denote stop members secured to the walls 52 of the dish-washing machine and located in the path of movement of the nozzle.

The reversing member described operates as follows.

In the position shown in Fig. 2, liquid entering the nozzle through the pipe 10 is discharged through the left hand opening 32. As a result of the hydraulic reactive force produced thereby the spraying device will be turned in a clockwise direction about the axis 16 until the pin 44 comes into contact with the stop member 50. The member 46 will then be moved to the left with the result that the outlet opening 32 will be closed by the face 38, whereas the opening 34 will be uncovered. Liquid then flows through the opening 34 and thereby creates a reactive force directed towards the left so that the spraying device will be turned in a counter-clockwise direction until the pin 42 comes into contact with the stop member 48, whereupon the direction of movement will again be reversed. This operation will be repeated, that is, the spraying device will perform an oscillating movement during the time liquid under pressure is supplied to the spraying device.

The liquid producing the reactive force is discharged through the outlet opening in a concentrated jet without being deflected and split. The device described also offers the advantage that the concentrated liquid jet discharged through the clearances between the outlet opening and pins results in an effective cleaning of the outlet openings by cooperation between the liquid and the axially and radially movable pins 42 and 44. This cleaning effect is increased due to the fact the length of each outlet opening is smaller than its diameter.

The outlet openings need obviously not entirely be closed by the valves cooperating therewith. The device will operate even if the outlet area be made quite large, although in such case the consumption of liquid will be relatively great.

Should the member 46 at the start of the spraying device be located in its central position, it may occur that liquid will be discharged simultaneously through both outlet openings 32 and 34 and produce reactive forces counterbalancing each other. This can, however, easily be prevented, for instance by means of a flange 54 provided on the member 46, which flange is disposed excentrically with respect to the central portion of the member 46 so as to be located nearer to one end of the member 46 than it is to the other end thereof. If the longitudinal offset flange 54 is struck by the liquid entering the nozzle, it will be moved in the one or the other direction due to the dynamic pressure exerted by the liquid and the fact that the pressure of the liquid entering the nozzle will be greater on one side of the flange 54 than on the other. If the member 46 at the start of the spraying device is in one of its end positions, the flange 54, due to the dynamic pressure exerted by the liquid, will contribute to maintain the member 46 in its position.

The invention is obviously not limited to the embodiment shown in the drawing by way of example only.

What I claim is:

1. A reversing member for hydraulically operated oscillating spraying devices for dishwashing machines, comprising a nozzle connected to the spraying device and communicating therewith, said nozzle having horizontally aligned outlet openings, the inner walls of said openings constituting valve seats, a reciprocating valve member in said nozzle and having spaced spherical valve faces, each of said faces arranged to engage an adjacent valve seat, said valve faces having pins extending outwardly therefrom and through the adjacent openings, spaced stop means in the path of movement of said nozzle and arranged to be alternately engaged by adjacent pins, and means for supplying liquid into said nozzle, said valve member being operable alternately to move the pins in contact with adjacent stop means to control the flow of the liquid through the outlet openings in opposite directions from the nozzle, the length of each outlet opening being smaller than the diameter thereof and the cross-sectional area of each pin being smaller than the cross-sectional area of the adjacent outlet opening so that the concentrated liquid jets discharged through the clearances between the outlet openings and the pins effect a cleaning of the outlet openings.

2. A reversing member for hydraulically operated oscillating spraying devices for dishwashing machines, comprising a nozzle connected to the spraying device and communicating therewith, said nozzle having horizontally aligned outlet openings, the inner walls of said openings constituting valve seats, a reciprocating valve member in said nozzle and having spaced spherical valve faces, each of said faces arranged to engage an adjacent valve seat, said valve faces having pins extending outwardly therefrom and through the adjacent openings, spaced stop means in the path of movement of said nozzle and arranged to be alternately engaged by adjacent pins, means for supplying liquid into said nozzle, said valve member being operable alternately to move the pins in contact with adjacent stop means to control the flow of the liquid through the outlet openings in opposite directions from the nozzle, the length of each outlet opening being smaller than the diameter thereof and the cross-sectional area of each pin being smaller than the cross-sectional area of the adjacent outlet opening so that the concentrated liquid jets discharged through the clearances between the outlet openings and the pins effect a cleaning of the outlet openings, and said valve member provided with means for preventing the simultaneous discharge of the liquid through both of said outlet openings.

TORD ERIK DANIEL BILDE.